(12) United States Patent
Namiki

(10) Patent No.: US 8,273,317 B2
(45) Date of Patent: Sep. 25, 2012

(54) METHOD FOR MANUFACTURING HIGH PURITY POLYCRYSTALLINE SILICON

(75) Inventor: Nobuaki Namiki, Kumamoto (JP)

(73) Assignee: JNC Corporation, Tokyo (JP)

( * ) Notice: Subject to any disclaimer, the term of this patent is extended or adjusted under 35 U.S.C. 154(b) by 274 days.

(21) Appl. No.: 12/841,452

(22) Filed: Jul. 22, 2010

(65) Prior Publication Data
US 2010/0284886 A1    Nov. 11, 2010

Related U.S. Application Data

(62) Division of application No. 12/049,641, filed on Mar. 17, 2008, now Pat. No. 7,785,546.

(30) Foreign Application Priority Data

Mar. 19, 2007  (JP) .................................. 2007-071076

(51) Int. Cl.
*C01B 33/02*  (2006.01)
*B01J 8/00*  (2006.01)

(52) U.S. Cl. ......... 423/348; 423/349; 423/350; 422/187
(58) Field of Classification Search .......... 423/348–350; 422/187–190, 198, 199, 202; 117/200, 204
See application file for complete search history.

(56) References Cited

U.S. PATENT DOCUMENTS

| 7,682,472 B2 | 3/2010 | Kaneko ......................... 148/538 |
| 2007/0123011 A1 | 5/2007 | Honda et al. .................. 438/488 |

FOREIGN PATENT DOCUMENTS

| JP | 60-161327 | 8/1985 |
| JP | 05-139891 | 6/1993 |
| JP | 2003-034519 | 2/2003 |
| JP | 2003-3242016 | 12/2003 |

*Primary Examiner* — Carlos Barcena
(74) *Attorney, Agent, or Firm* — J.C. Patents

(57) ABSTRACT

An method for manufacturing a high purity polycrystalline silicon is characterized by comprising: supplying a silicon chloride gas from a silicon chloride gas supply nozzle and a zinc gas from a zinc gas supply nozzle into a vertical reactor, and generating downward a polycrystalline silicon agglomerated in an almost tube shape on the leading end part of the silicon chloride gas supply nozzle by the reaction of the silicon chloride gas and the zinc gas.

5 Claims, 5 Drawing Sheets

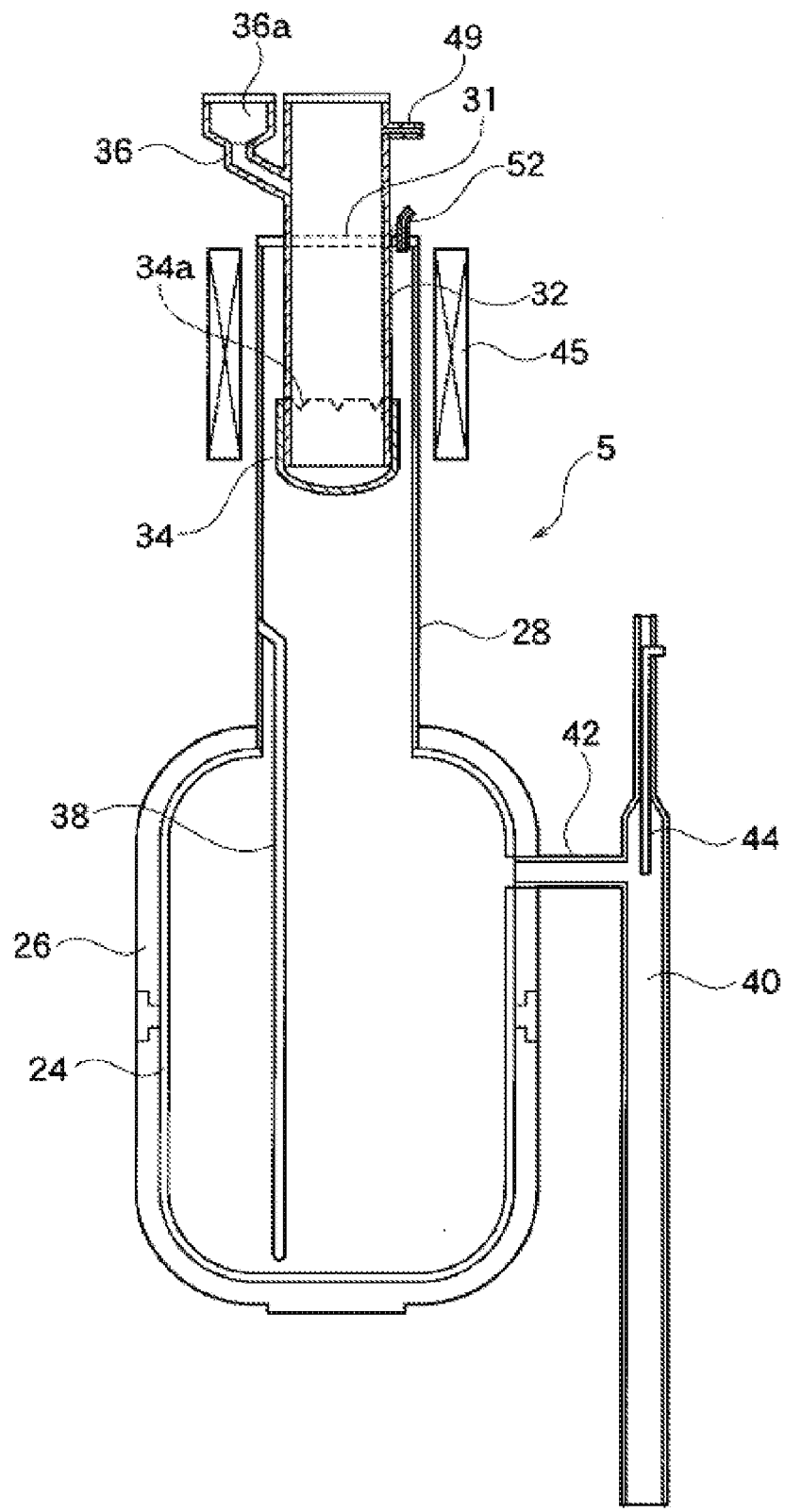
[Fig. 1]

[Fig. 2]
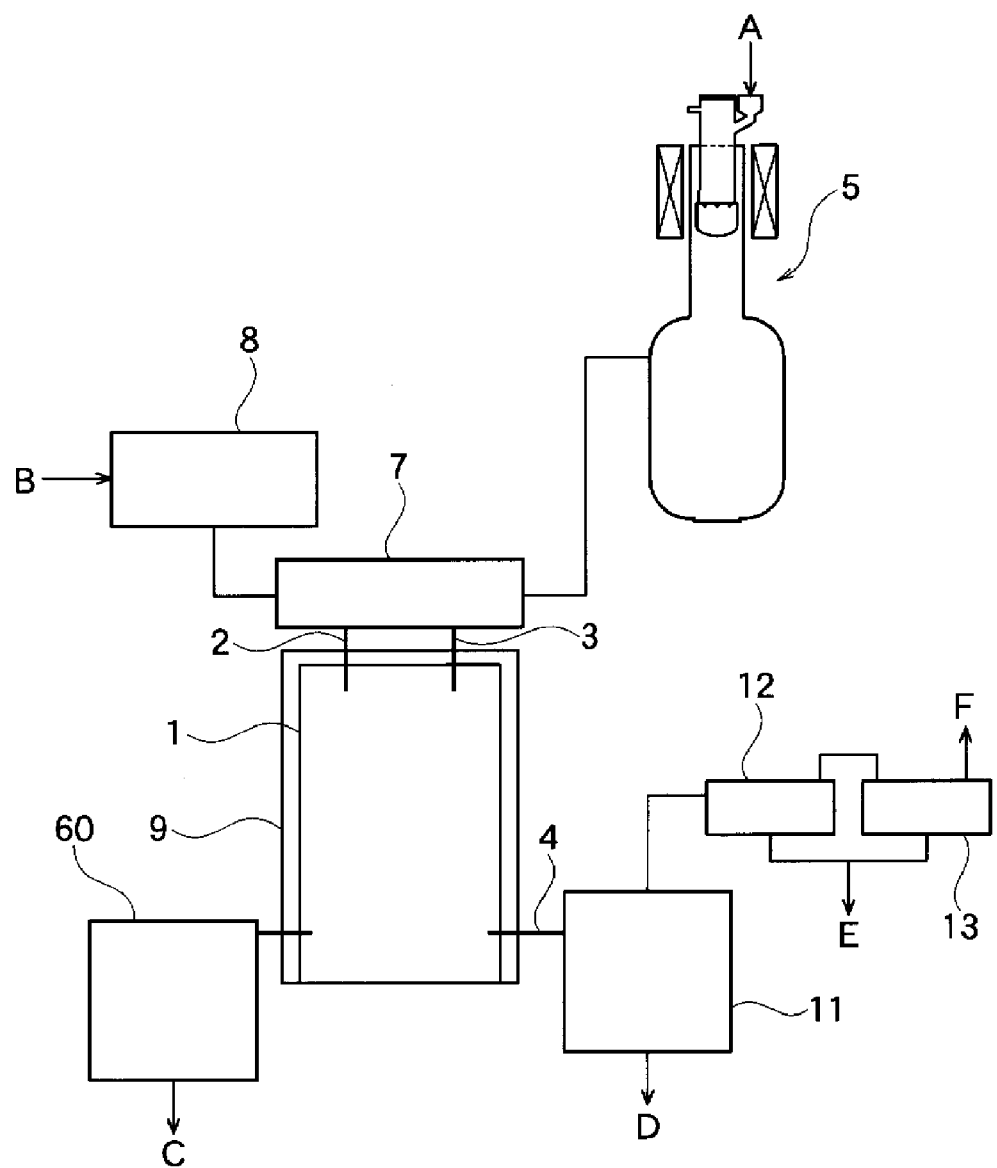

[Fig. 3]
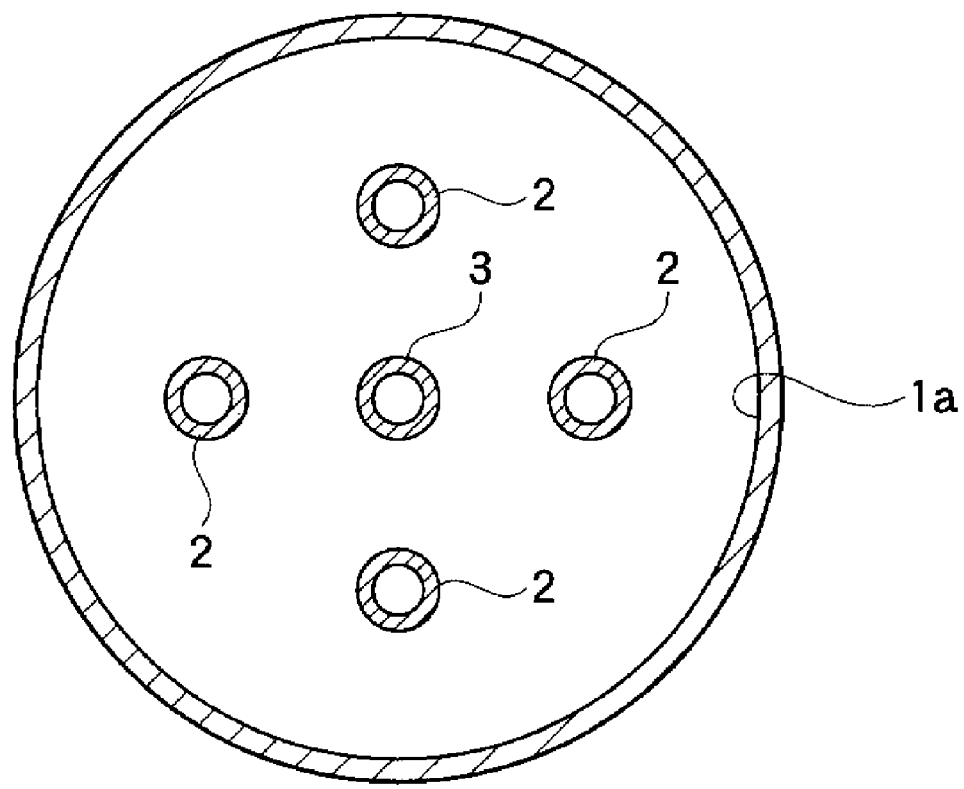

[Fig. 4]
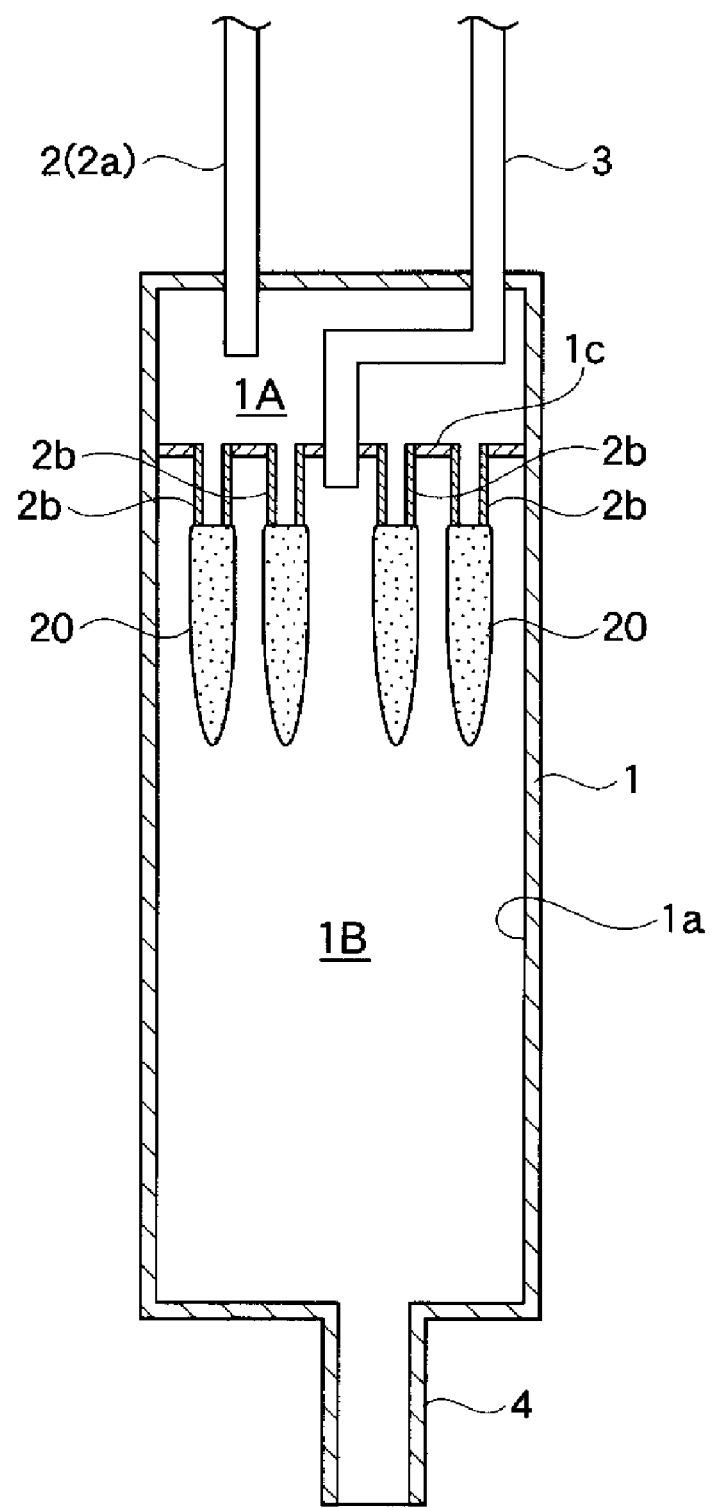

[Fig. 5]
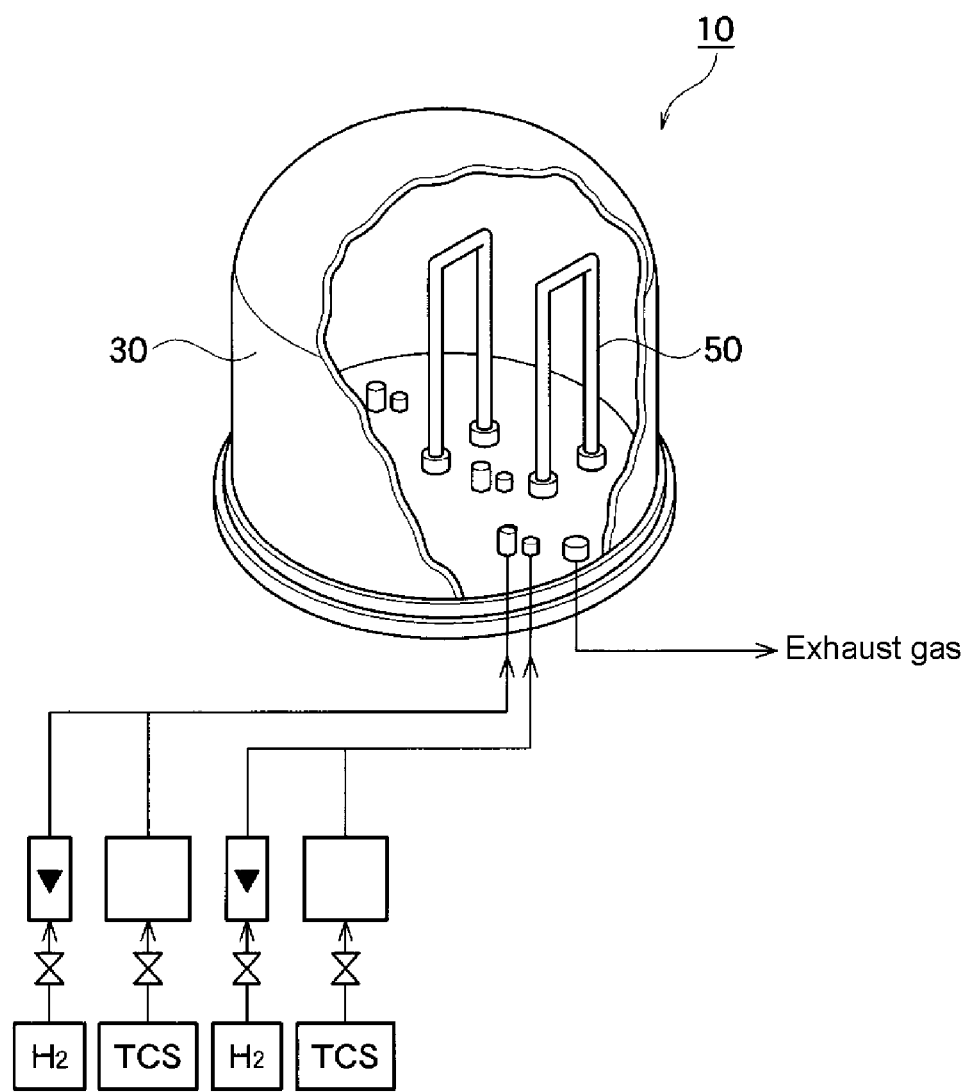

METHOD FOR MANUFACTURING HIGH PURITY POLYCRYSTALLINE SILICON

CROSS-REFERENCE TO RELATED APPLICATION

This application is a divisional application of U.S. patent application Ser. No. 12/049,641 filed on Mar. 17, 2008, which claims the priority benefit of Japan application No. 2007-071076, filed on Mar. 19, 2007. The contents of the above two applications are incorporated herein by reference in their entirety.

BACKGROUND OF THE INVENTION

1. Field of the Invention

The present invention relates to an apparatus and a method for manufacturing a high purity polycrystalline silicon.

2. Description of the Related Art

A polycrystalline silicon is used as a raw material of a monocrystalline silicon for a semiconductor or a raw material of a silicon for a solar cell. In recent years, according to the situation in which a diffusion of a solar cell is greatly expanded, a demand of a polycrystalline silicon have been increasing as a raw material of the solar cell in particular.

However, as a polycrystalline silicon that is a raw material of a silicon for a solar cell, it is a present situation that a scrap such as a crucible residue after a monocrystalline silicon for a semiconductor is removed and a cutting abatement debris of a monocrystalline silicon ingot is used. Consequently, since a polycrystalline silicon to be used for a solar cell depends on a trend of the semiconductor industry in quality and quantity, the polycrystalline silicon is in short supply chronically as the situation now stands.

The Siemens method can be mentioned as a typical method for manufacturing a high purity polycrystalline silicon that is a raw material of a monocrystalline silicon for a semiconductor. For the Siemens method, a high purity polycrystalline silicon can be obtained by the hydrogen reduction of trichlorosilane ($HSiCl_3$) (see Japanese Patent No. 2867306 (Japanese Patent Application Laid-Open Publication No. 5-139891)).

For the common Siemens method, as shown by a manufacturing apparatus 10 in FIG. 5, a silicon seed rod 50 is disposed in a water-cooled reaction vessel 30 of a bell jar type, an electricity is conducted in the silicon seed rod 50 to heat the seed rod 50 up to approximately 1000° C., trichlorosilane ($HSiCl_2$) and hydrogen ($H_2$) as a reducing agent are introduced into the reaction vessel 30 from the bottom side to reduce silicon chloride, and a generated silicon adheres to the surface of the seed rod 50 selectively, thereby obtaining a rod shaped polycrystalline silicon. The Siemens method has the advantage related to an apparatus that an atmosphere can be easily sealed since the reaction vessel 30 itself is cooled in addition to the advantage that a raw material gas can be vaporized at a comparatively low temperature. Consequently, the Siemens method has been in widespread use and adopted extensively.

However, since the seed rod 50 is heated by a current conduction for the Siemens method, an excessive current must be flown to heat the seed rod as the rod shaped silicon is grown by an adhesion of a polycrystalline silicon and an electrical resistance is decreased by a gradual process. Consequently, a growth limit exists due to a balance with an energy cost, and the running of a manufacturing facility is in a batch system, thereby deteriorating a production efficiency. Moreover, an electric power consumption rate is large to a cost of a polycrystalline silicon in a product unfortunately.

As a method for manufacturing a polycrystalline silicon other than the Siemens method, a method by a reduction of silicon tetrachloride ($SiCl_4$) using a metal reducing agent can be mentioned for instance (see Japanese Patent Application Laid-Open Publication No. 2003-34519 and Japanese Patent Application Laid-Open Publication No. 2003-342016). To be more precise, a silicon tetrachloride gas and a zinc (Zn) gas are supplied into a horizontal reaction vessel made of quartz heated to approximately 1000° C., thereby growing a polycrystalline silicon in the reaction vessel.

For the above method, zinc chloride ($ZnCl_2$) obtained as a by-product material can be separated into zinc and chlorine by a method such as electrolysis, the obtained zinc can be used as a reducing agent again, and the obtained chlorine can be reacted to an inexpensive metal silicon to synthesize a silicon tetrachloride to be used as a raw material gas. In that case, a recycling-oriented process can be constructed. Consequently, there is a possibility that a polycrystalline silicon can be manufactured at a low cost.

It is general that a solid is fused to be liquid in a vessel and gasified in the same vessel in order to change a metal from a solid to a gas (see Japanese Patent Application Laid-Open Publication No. 60-161327).

In the case in which zinc is gasified by such a method, a production efficiency of a zinc gas is deteriorated. Moreover, in the case in which a zinc granule is put into a vessel heated to be a boiling point or higher of zinc, there is a possibility that powdered zinc or granulated zinc is partially burnt in the vessel. Furthermore, it is difficult to increase or decrease an input amount of additional zinc. In the case in which the input amount is too large, a fusing temperature in the vessel is greatly reduced, and a stable amount of evaporation of a zinc gas cannot be obtained unfortunately.

Moreover, for an apparatus for manufacturing a high purity polycrystalline silicon, in which such a fusing evaporator of zinc has been adopted, a polycrystalline silicon to be obtained by a reaction is easily affected by a pollution from a reactor material since the polycrystalline silicon is grown from a reactor wall, thereby deteriorating a production efficiency of a polycrystalline silicon unfortunately.

Patent document 1: Japanese Patent No. 2867306 (Japanese Patent Application Laid-Open Publication No. 5-139891)
Patent document 2: Japanese Patent Application Laid-Open Publication No. 2003-34519
Patent document 3: Japanese Patent Application Laid-Open Publication No. 2003-342016
Patent document 4: Japanese Patent Application Laid-Open Publication No. 60-161327

SUMMARY OF THE INVENTION

An apparatus for manufacturing a high purity polycrystalline silicon in accordance with the present invention is characterized by comprising:
a vaporizer of silicon chloride;
a fusing evaporator of zinc;
a vertical reactor provided with a heating means on the peripheral face thereof;
a silicon chloride gas supply nozzle disposed to connect the vaporizer of silicon chloride and the vertical reactor and for supplying a silicon chloride gas supplied from the vaporizer of silicon chloride into the vertical reactor;

a zinc gas supply nozzle disposed to connect the fusing evaporator of zinc and the vertical reactor and for supplying a zinc gas supplied from the fusing evaporator of zinc into the vertical reactor; and an exhaust gas vent pipe connected to the vertical reactor, the fusing evaporator of zinc, further comprising:

a zinc evaporator;

a main vertical cylinder part connected to the upper part of a zinc evaporator;

a solid trapping pipe inserted into the main vertical cylinder part;

a zinc introducing pipe connected to the solid trapping pipe at an angle;

a seal pot disposed to surround the lower end opening portion of the solid trapping pipe and for configuring the bottom face of the solid trapping pipe;

an induction heater disposed on the peripheral face of the main vertical cylinder part and capable of controlling a temperature; and a gas vent pipe connected to the side wall of the a zinc evaporator.

BRIEF DESCRIPTION OF THE DRAWINGS

FIG. 1 is a schematic view showing a fusing evaporator of zinc in accordance with an embodiment of the present invention.

FIG. 2 is a schematic block diagram showing a manufacturing facility provided with an apparatus for manufacturing a polycrystalline silicon in accordance with an embodiment of the present invention.

FIG. 3 is a plan view showing an example of an installation mode of a silicon chloride gas supply nozzle to a zinc gas supply nozzle.

FIG. 4 is a partially cross-sectional view showing an apparatus for manufacturing a polycrystalline silicon in accordance with another embodiment of the present invention.

FIG. 5 is a schematic view showing a manufacturing apparatus using the Siemens method that has been adopted extensively.

EXPLANATIONS OF LETTERS OR NUMERALS

2: Silicon chloride gas supply nozzle
3: Zinc gas supply nozzle
5: Fusing evaporator
8: Vaporizer
24: Zinc evaporator
26: Reinforcement material
28: Main vertical cylinder part
31: Top flange
32: Solid trapping pipe
34: Seal pot
34a: Cut groove
36: Zinc introducing pipe
36a: Hopper
38: Thermometer
40: Gas vent pipe
42: Connecting tube
44: Safety device
60: Cooling and grinding apparatus
A: Zinc solid
B: Silicon chloride

DETAILED DESCRIPTION OF THE INVENTION

The invention includes:

[1] An apparatus for manufacturing a high purity polycrystalline silicon, comprising:

a vaporizer of silicon chloride;

a fusing evaporator of zinc;

a vertical reactor provided with a heating means on the peripheral face thereof;

a silicon chloride gas supply nozzle disposed to connect the vaporizer of silicon chloride and the vertical reactor and for supplying a silicon chloride gas supplied from the vaporizer of silicon chloride into the vertical reactor;

a zinc gas supply nozzle disposed to connect the fusing evaporator of zinc and the vertical reactor and for supplying a zinc gas supplied from the fusing evaporator of zinc into the vertical reactor; and an exhaust gas vent pipe connected to the vertical reactor, the fusing evaporator of zinc, further comprising:

a zinc evaporator;

a main vertical cylinder part connected to the upper part of the zinc evaporator;

a solid trapping pipe inserted into the main vertical cylinder part;

a zinc introducing pipe connected to the solid trapping pipe—at an angle;

a seal pot disposed to surround the lower end opening portion of the solid trapping pipe and for configuring the bottom face of the solid trapping pipe;

an induction heater disposed on the peripheral face of the main vertical cylinder part and capable of controlling a temperature; and a gas vent pipe connected to the side wall of the zinc evaporator.

By the present invention having the above configuration, zinc is heated and fused by an induction heating from the outside, thereby fusing a zinc granule at an appropriate temperature and an appropriate fusion rate for instance.

[2] The apparatus for manufacturing a high purity polycrystalline silicon as defined in item [1], wherein a reinforcement material is attached to the outside of the zinc evaporator.

By such a configuration, the zinc evaporator can be heated almost uniformly in whole.

Moreover, by the present invention, a polycrystalline silicon that is grown on the leading end part of the silicon chloride gas supply nozzle is grown almost downward without coming into contact with a wall surface of the reactor, thereby manufacturing a high purity silicon continuously.

Moreover, since a plurality of silicon chloride gas supply nozzles is disposed, a large amount of polycrystalline silicon can be manufactured using a limited space efficiently.

[3] The apparatus for manufacturing a high purity polycrystalline silicon as defined in item [1], wherein the seal pot is attached to the solid trapping pipe.

By such a configuration, a zinc granule or the like that has been dropped in the seal pot from the solid trapping pipe can be completely fused in the seal pot, and can also be made overflow from the seal pot. Consequently, a continuous operation can be carried out in small amounts.

[4] The apparatus for manufacturing a high purity polycrystalline silicon as defined in item [1] or [3], wherein a cut groove is formed at the upper opening end of the seal pot.

By such a configuration, fused zinc can be dropped downward via the cut groove.

Moreover, since a fused metal is always held in the seal pot, a metal vapor in the zinc evaporator can be prevented from leaking to the metal fusing pipe side.

[5] The apparatus for manufacturing a high purity polycrystalline silicon as defined in item [1], wherein an inert gas introduction pipe is connected to the solid trapping pipe and the main vertical cylinder part.

By such a configuration, a gas containing oxygen such as an air can be prevented from getting mixed in fused zinc.

[6] A method for manufacturing a high purity polycrystalline silicon using the apparatus for manufacturing a high purity polycrystalline silicon as defined in any one of item [1] to [5], comprising the steps of:

supplying a silicon chloride gas from the silicon chloride gas supply nozzle and a zinc gas from the zinc gas supply nozzle into the vertical reactor; and generating downward a polycrystalline silicon agglomerated in a almost tube shape on the leading end part of the silicon chloride gas supply nozzle by a reaction of the silicon chloride gas and the zinc gas.

By such a method, a high purity polycrystalline silicon can be continuously manufactured in great quantities at a comparatively low cost.

By the manufacturing method that is carried out using the apparatus for manufacturing a high purity polycrystalline silicon in accordance with the present invention, since a fusing evaporation of zinc as a reducing agent can be carried out almost continuously at a low cost, a high purity polycrystalline silicon can be continuously manufactured in great quantities at a comparatively low cost. Moreover, since a volumetric capacity of a section for fusing zinc can be decreased, the apparatus can be miniaturized. Furthermore, since an amount to be heated can be easily controlled corresponding to a supply quantity, an energy loss can be reduced.

Moreover, by the present invention, a polycrystalline silicon agglomerated in a tube shape can be continuously generated downward below the silicon chloride gas supply nozzle that is disposed in the upper section of the reactor, and can be grown without coming into contact with a wall surface of the reactor. Consequently, a high purity polycrystalline silicon can be manufactured while preventing an influence of a contamination via the wall surface of the reactor.

For the apparatus for manufacturing a high purity polycrystalline silicon in accordance with the present invention, since a polycrystalline silicon is grown downward in a hollow pipe shape, the nozzle can be prevented from being clogged. Moreover, a polycrystalline silicon obtained by the present invention can be made fall in drops by a mechanical method such as vibration and scraping after being grown to have an appropriate length.

For the apparatus for manufacturing a high purity polycrystalline silicon in accordance with the present invention, a polycrystalline silicon is grown in such a manner that the polycrystalline silicon hangs from the nozzle without coming into contact with an inner wall surface of the reactor. Therefore, a material that configures the reactor is not restricted and can be freely selected from materials having a resistance property in the operating temperature range.

Moreover, by the above reasons, an obtained polycrystalline silicon has a high degree of purity, and can be used as a raw material of a silicon for a semiconductor as well as a raw material of a silicon for a solar cell.

Furthermore, since an opening end of the zinc gas supply nozzle is disposed above an opening end of the silicon chloride gas supply nozzle, a reducing agent gas can be efficiently reacted to a silicon chloride gas without growing a polycrystalline silicon on the opening end of the zinc gas supply nozzle.

An embodiment of the present invention will be described below in detail with reference to the drawings. First, a fusing evaporator of zinc adopted for an apparatus for manufacturing a high purity polycrystalline silicon in accordance with the present invention.

FIG. 1 is a view showing a fusing evaporator of zinc in accordance with an embodiment of the present invention.

In the fusing evaporator 5 of zinc, a zinc evaporator 24 is formed in an almost blocked cylindrical shape, and a reinforcement material 26 made of carbon for instance is attached to the peripheral part of the zinc evaporator, thereby heating the surface of the zinc evaporator uniformly. The zinc evaporator 24 to which the reinforcement material 26 has been attached is held in an electric furnace, which is not shown.

A main vertical cylinder part 28 is connected to the upper part of the zinc evaporator 24, and a top flange 31 is fitted into an upper opening end of the main vertical cylinder part 28. A solid trapping pipe 32 is inserted into the main vertical cylinder part 28 through the top flange 31. The bottom end of the solid trapping pipe 32 is opened, and a seal pot 34 is disposed in such a manner that the seal pot 34 is facing the opening portion. The seal pot 34 configures the bottom face of the solid trapping pipe 32.

The seal pot 34 shown in FIG. 1 is attached to the solid trapping pipe 32 via a fixing member such as a spacer (not shown) disposed between the peripheral face of the solid trapping pipe 32 and the inner circumference face of the seal pot 34. Such a fixing member is disposed between the solid trapping pipe 32 and the seal pot 34, thereby ensuring a fluid path for making a fused metal flow outside from the seal pot 34.

In the case in which seal pot 34 is attached to the solid trapping pipe 32 as described above, the solid trapping pipe 32 together with seal pot 34 can be pulled upward out of the main vertical cylinder part 28 even if fused zinc remains in seal pot 34. Consequently, in the case of FIG. 1, the solid trapping pipe 32 can be replaced in the state that fused zinc remains in seal pot 34.

Moreover, unlike the case of FIG. 1, an appropriate fixing member such as a spacer is disposed between the peripheral face of the seal pot 34 and the inner circumference face of the main vertical cylinder part 28, and seal pot 34 can also be fixed via the fixing member.

However, in consideration of a replacement working property of the solid trapping pipe 32, it is preferable to attach seal pot 34 to the solid trapping pipe 32 as shown in FIG. 1. In the case in which seal pot 34 is attached to the main vertical cylinder part 28, although the solid trapping pipe 32 can be replaced, fused zinc remains in seal pot 34.

A zinc introducing pipe 36 is connected to the middle of the solid trapping pipe 32 from an upper side at an angle, and a hopper 36a is attached to the zinc introducing pipe 36. The hopper 36a is in communication with the atmosphere.

A thermometer 38 is inserted into the zinc evaporator 24, and an internal temperature can be measured by the thermometer 38. A gas vent pipe 40 is connected to the side wall of zinc evaporator 24 via a connecting tube 42, and a zinc gas as a reducing agent is introduced outside in a lower direction through the gas vent pipe 40. A safety device 44 is attached to the upper part of the gas vent pipe 40 to allow an internal pressure to be reduced in the case in which the internal pressure becomes a predetermined value or higher.

For the fusing evaporator 5 of zinc having such a configuration, an induction heater 45 is disposed on the peripheral face of the main vertical cylinder part 28. The induction heater 45 is for generating a rotating magnetic field by an alternating current, and a temperature control can be carried out based on the strength of a magnetic field.

In the present embodiment, parts such as the zinc evaporator 24, the main vertical cylinder part 28, the top flange 31, the solid trapping pipe 32, the seal pot 34, and the zinc introducing pipe 36 are made of quartz, thereby improving a heat resisting property.

The inert gas supply pipes 49 and 52 are connected to the solid trapping pipe 32 and the main vertical cylinder part 28, respectively. In the case in which an inert gas is introduced from the inert gas supply pipes 49 and 52, an internal air is substituted by an inert gas.

The fusing evaporator 5 of zinc is used for gasifying powdered metal zinc or granulated metal zinc. In the case of a raw material in a rod shape, the raw material is inserted into the solid trapping pipe 32 from the upper side.

The operation of the fusing evaporator 5 of zinc will be described in the following.

The zinc evaporator 24 is held in an electric furnace, which is not shown. The electric furnace is heated to a predetermined temperature, 1,000° C. for instance.

The inside of the zinc evaporator 24 is heated to a predetermined temperature in the electric furnace, and a zinc granule is then put into the hopper 36*a* attached to the zinc introducing pipe 36. By this process, a zinc granule is introduced into the solid trapping pipe 32 through the zinc introducing pipe 36.

Here, the induction heater 45 disposed on the periphery of the main vertical cylinder part 28 is driven by using a control panel installed outside. The zinc granule introduced into the solid trapping pipe 32 is stored in the seal pot 34 on a temporary basis, and heated by the induction heater 45 in the seal pot 34. The zinc granule is then fused in seal pot 34. In proportion to an increase in an amount of zinc granules put into the hopper 36*a*, a liquid level rises in the seal pot 34. Fused zinc then leaks from a cut groove 34*a* formed at the upper end of seal pot 34 and falls in drops downward below the seal pot 34.

The inside of the zinc evaporator 24 has been heated to be a boiling point or higher of zinc in the above electric furnace. Consequently, fused zinc that has fallen in drops into the zinc evaporator is vaporized in a moment and dispersed in the zinc evaporator. A zinc gas filled in the zinc evaporator is introduced to the bottom end opening side of the gas vent pipe 40 via a connecting tube 42, and supplied from the bottom end opening to a superheat chamber 7 shown in FIG. 2 as a subsequent process. In the case in which an amount of evaporation of fused zinc is extremely large and a pressure in the zinc evaporator 24 is extremely increased, the safety device 44 is operated.

As described above, a zinc granule put into the hopper 36*a* is directly fused by using the induction heater 45 in the present embodiment. Consequently, a volumetric capacity of a section for fusing zinc can be decreased. Moreover, a heating temperature caused by the induction heater 45 can be controlled corresponding to a supply quantity of a zinc granule. Therefore, an apparatus for gasifying zinc can be miniaturized and an energy loss can be reduced.

The following describes an apparatus and a method for manufacturing a high purity polycrystalline silicon, in which such a fusing evaporator 5 of zinc is adopted.

FIG. 2 is a schematic view showing a basic configuration of an apparatus for manufacturing a high purity polycrystalline silicon in accordance with an embodiment of the present invention. However, the present invention is not restricted to the descriptions, and the present invention includes the range in which various changes or modifications can be thus carried out as needed based on the total descriptions of the present specification by so-called a person having ordinary skill in the art.

For an apparatus for manufacturing a high purity polycrystalline silicon in accordance with the present embodiment, a vertical reactor 1 in an almost cylindrical shape is adopted.

As shown in FIG. 2, metal zinc A is gasified by the above fusing evaporator 5 of zinc, and silicon chloride B is gasified by a vaporizer 8 or the like. The gasified zinc A and silicon chloride B are heated to the range of 800 to 1200° C. that is a temperature suitable for a reduction reaction by the superheat chamber 7 disposed at the former stage of the reactor 1, and are supplied to the reactor 1 that has been heated to the range of 800 to 1200° C. by a reactor heating furnace 9. In the case in which a reactor provided with a raw material gas heating zone is used, zinc and silicon chloride can be supplied to the reactor at a temperature lower than the above temperature, and can be heated internally to a temperature suitable for a reaction.

A silicon chloride gas supplied from a silicon chloride gas supply nozzle 2 into the reactor 1 is reduced immediately by a zinc gas supplied from a zinc gas supply nozzle 3 to be made silicon. As shown in FIG. 4, a generated silicon adheres immediately to the leading end of the silicon chloride gas supply nozzle 2, and is grown downward below the nozzle from the leading end of the silicon chloride gas supply nozzle as a starting point while forming a structure agglomerated in a tube shape. In the case in which a polycrystalline silicon 20 agglomerated in a tube shape (tube-like agglomerated silicon 20) is grown to have a certain level of length, the agglomerated silicon 20 is left out of the nozzle and falls in drops to the bottom of the reactor by own weight thereof or a mechanical shock. In the case in which a raw material is further supplied continuously after that, a new tube-like agglomerated silicon 20 is grown on the silicon chloride gas supply nozzle 2.

In the manufacturing apparatus in accordance with the above embodiment, the figure shows the configuration in which one silicon chloride gas supply nozzle 2 and one zinc gas supply nozzle 3 are inserted into the reactor 1. However, as shown in FIG. 3, a plurality of silicon chloride gas supply nozzles 2 is disposed around a zinc gas supply nozzle 3 in practice.

Moreover, in the present embodiment, the silicon chloride gas supply nozzle 2 and the zinc gas supply nozzle 3 are independently inserted directly into the reactor 1. However, the present invention is not restricted to this configuration. For instance, in the case in which a plurality of silicon chloride gas supply nozzles 2 is disposed, it is also possible that an upstream side portion 2*a* is used commonly and downstream side portions 2*b* branch off in plural ways as shown in FIG. 4. More specifically, in the example shown in FIG. 4, a small chamber 1A is formed by a partition 1*c* at an upper section of the reactor 1, the upstream side portion 2*a* of the silicon chloride gas supply nozzle 2 is opened in the small chamber 1A, and a plurality of downstream side portions 2*b* is opened in a reaction chamber 1B formed below the partition 1*c*. The downstream side portions 2*b* are disposed in a radial pattern to the zinc gas supply nozzle 3 as shown in FIG. 3.

As described above, even in the case in which the downstream side of the silicon chloride gas supply nozzle 2 branches off independently, a polycrystalline silicon 20 agglomerated in a tube shape can be generated on the leading end part of the downstream side portion 2*b* of the silicon chloride gas supply nozzle 2.

As shown in FIG. 2, a polycrystalline silicon C that has been grown and has been left out in the reactor 1 is cooled on the bottom of the reactor or in a cooling and grinding apparatus 60. The polycrystalline silicon C is ground as needed and can be ejected outside the reactor system by a shutter type valve attached to the bottom of the reactor or the cooling and grinding apparatus 60. Or more specifically, by heating the bottom of the reactor to 1420° C. or higher that is a melting point of silicon, silicon in a fused state (in a state of silicon melt) can be taken out from the reactor system.

An exhaust gas extracted from an exhaust gas vent pipe 4 contains chloride of a reducing agent (zinc chloride for instance), unreacted silicon chloride and a reducing agent, and a polycrystalline silicon generated on the exhaust gas vent route. Consequently, a reducing agent chloride D and an unreacted silicon chloride E are recovered for a recycle or the like by using a reducing agent chloride recovery tank 11, a water condenser 12, and a brine condenser 13. An exhaust gas or the like that cannot be recycled is processed in an appropriate manner by an exhaust gas treatment facility F or the like.

For an apparatus for manufacturing a high purity polycrystalline silicon in accordance with the present embodiment, a silicon chloride gas is supplied from the silicon chloride gas supply nozzle 2 into the above vertical reactor 1, and a zinc gas is supplied from the zinc gas supply nozzle 3 into the vertical reactor 1. By these reactions, without using a seed rod or the like that is used in the Siemens method, a polycrystalline silicon 20 agglomerated in a tube shape can be generated on the leading end part 2a of the silicon chloride gas supply nozzle 2, and the polycrystalline silicon 20 can be grown downward below the leading end part of the nozzle.

In the present embodiment, a polycrystalline silicon in which a silicon crystal is agglomerated in a tube shape is grown in such a manner that the polycrystalline silicon hangs from the silicon chloride gas supply nozzle 2. Consequently, a polycrystalline silicon 20 can be grown without coming into contact with an inner wall surface 1a of the reactor. Therefore, a high purity polycrystalline silicon can be obtained without being affected by a contamination of a material of the reactor. Moreover, by the above reason, there is an advantage that a material that configures the reactor and the combination of a sealing material and a configuration material are not greatly restricted. As a material of the reactor, quartz and silicon carbide can be used for instance.

A high purity polycrystalline silicon in accordance with the present invention is a polycrystalline silicon having a degree of purity of 99.999% or higher, which can be used as a raw material of a silicon for a solar cell and as a raw material of a silicon for a semiconductor.

For a manufacturing method in accordance with the present invention, a plane orientation of a crystal growth direction of a polycrystalline silicon is a (111) plane. It is believed that since a mono-crystallized crystal is thus grown with anisotropism in a specific plane direction, a segregation of an impurity in a silicon is carried out on a crystal interface (surface), thereby obtaining a high purity polycrystalline silicon.

The tube-shaped agglomerated silicon 20 that gas been grown as described above becomes heavier as it is grown. The tube-shaped agglomerated silicon 20 is then left out of the silicon chloride gas supply nozzle 2 and falls in drops by own weight thereof, thereby preventing the nozzle 2 from being clogged. Moreover, the tube-shaped agglomerated silicon 20 that gas been grown to have an appropriate length can be dropped by a mechanical method such as vibration and scraping. A dropped polycrystalline silicon C is cooled in a cooling zone disposed on the bottom of the reactor, or is fused by heating the bottom of the reactor to a temperature of a melting point of silicon or higher to make silicon melt. The polycrystalline silicon C can then be taken out continuously outside the reactor system from the bottom of the reactor. Consequently, a process for continuously obtaining a high purity polycrystalline silicon without stopping an operation can be constructed, thereby stably manufacturing an inexpensive high purity polycrystalline silicon in great quantities.

As a silicon chloride gas that can be used for the present invention, a gas such as silicon tetrachloride, trichlorosilane, and dichlorosilane ($H_2SiCl_2$) can be used. Among them, a silicon tetrachloride gas is preferable since a complicated by-product material is not generated and a recovery thereof can be easily carried out. As a reducing agent gas, sodium (Na), potassium (K), and magnesium (Mg) in addition to zinc (Zn) can be adopted for instance. Moreover, a hydrogen gas ($H_2$) can also be used.

As described above, an apparatus and a method for manufacturing a high purity polycrystalline silicon in accordance with the present invention enable a zinc gas as a reducing agent to be supplied continuously, thereby manufacturing a polycrystalline silicon continuously at a comparatively low cost.

What is claimed is:

1. A method for manufacturing a high purity polycrystalline silicon using an apparatus that comprises:
    a vaporizer of silicon chloride,
    a fusing evaporator of zinc,
    a vertical reactor provided with a heating means on the peripheral face thereof,
    a silicon chloride gas supply nozzle disposed to connect the vaporizer of silicon chloride and the vertical reactor and for supplying a silicon chloride gas supplied from the vaporizer of silicon chloride into the vertical reactor,
    a zinc gas supply nozzle disposed to connect the fusing evaporator of zinc and the vertical reactor and for supplying a zinc gas supplied from the fusing evaporator of zinc into the vertical reactor, and
    an exhaust gas vent pipe connected to the vertical reactor,
    wherein the fusing evaporator of zinc comprises:
    a zinc evaporator,
    a main vertical cylinder part connected to the upper part of the zinc evaporator,
    a solid trapping pipe inserted into the main vertical cylinder part,
    a zinc introducing pipe connected to the solid trapping pipe at an angle,
    a seal pot disposed to surround the lower end opening portion of the solid trapping pipe and for configuring the bottom face of solid trapping pipe,
    an induction heater disposed on the peripheral face of the main vertical cylinder part and capable of controlling a temperature, and
    a gas vent pipe connected to the side wall of the zinc evaporator,
    the method comprising the steps of:
    supplying a silicon chloride gas from the silicon chloride gas supply nozzle and a zinc gas from the zinc gas supply nozzle into the vertical reactor; and
    generating downward a polycrystalline silicon agglomerated in an almost tube shape on the leading end part of the silicon chloride gas supply nozzle by a reaction of the silicon chloride gas and the zinc gas.

2. The method of claim 1, wherein in the apparatus used, a reinforcement material is attached to the outside of the zinc evaporator.

3. The method of claim 1, wherein in the apparatus used, the seal pot is attached to the solid trapping pipe.

4. The method of claim 1, wherein in the apparatus used, a cut groove is formed at the upper opening end of the seal pot.

5. The method of claim 1, wherein in the apparatus used, an inert gas introduction pipe is connected to the solid trapping pipe and the main vertical cylinder part.

* * * * *